(No Model.)
E. N. HIGLEY.
SULKY.
No. 550,885. Patented Dec. 3, 1895.
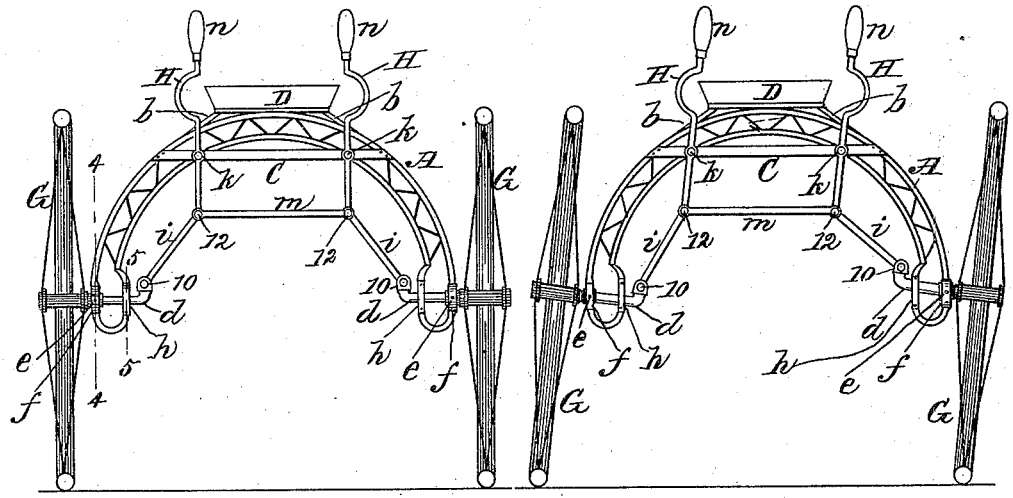
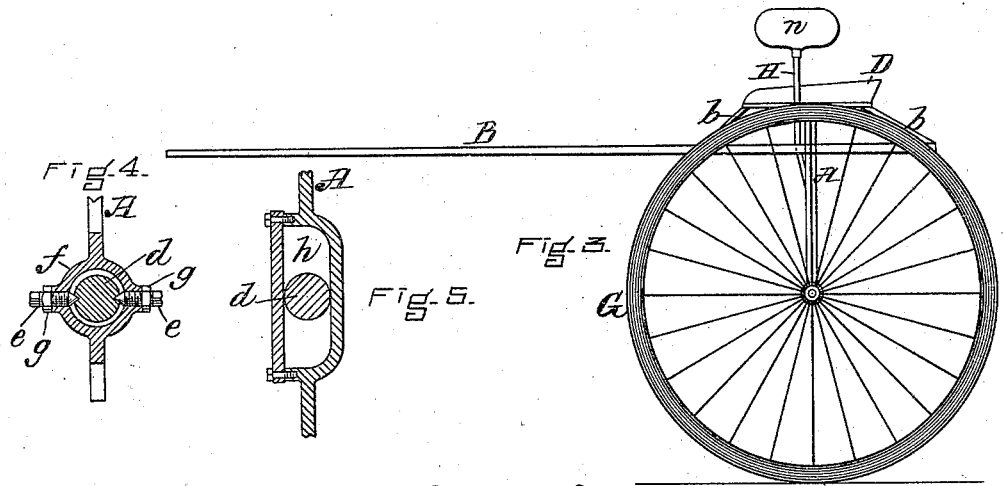
WITNESSES
A. E. Humiston
George A. Yeo
INVENTOR
Eben N. Higley
by J. C. Teschemacher
Atty

UNITED STATES PATENT OFFICE.

EBEN N. HIGLEY, OF SOMERSWORTH, NEW HAMPSHIRE.

SULKY.

SPECIFICATION forming part of Letters Patent No. 550,885, dated December 3, 1895.

Application filed June 17, 1895. Serial No. 553,146. (No model.)

*To all whom it may concern:*

Be it known that I, EBEN N. HIGLEY, a citizen of the United States, residing at Somersworth, in the county of Strafford and State of New Hampshire, have invented certain Improvements in Sulkies, of which the following is a full, clear, and exact description, reference being had to the accompanying drawings, making part of this specification, in which—

Figure 1 is a rear elevation of a sulky constructed in accordance with my invention. Fig. 2 is a similar elevation showing the wheels inclined to a vertical plane in parallelism with each other. Fig. 3 is a side elevation of my sulky. Fig. 4 is a vertical section on the line 4 4 of Fig. 1. Fig. 5 is a vertical section on the line 5 5 of Fig. 1. Fig. 6 is a rear elevation of a sulky embodying my invention and illustrating a modification of the same.

In horse-racing with sulkies it is customary for the driver in going around a curve in the track to lean over toward the inner side of the same in order to change the center of gravity and overcome the tendency of the vehicle to slew or be thrown toward the outside by centrifugal force. To still further counteract this tendency of the vehicle to be thrown outward or away from the center is the object of my invention, which consists in a vehicle having a pair of wheels mounted on independent transversely-pivoted axles and means under the control of the driver for swinging said axles on their pivots, whereby the wheels may be inclined in parallelism at an angle to their normal vertical plane of revolution in going around a curve, as hereinafter set forth; and my invention also consists in certain combinations of parts and details of construction as hereinafter set forth, and specifically pointed out in the claims.

In the said drawings, A represents the arched frame of a sulky; B, the shafts or thills; C, the back-bar, and D the seat, the latter being supported by means of rods or braces $b$, secured to the shafts. G G are the wheels, which are mounted on short independent axles $d$, which are transversely pivoted on screw-pins $e$, Fig. 4, within hangers $f$, formed at the opposite lower ends of the outer portion of the frame A, said pins $e$ being provided with check-nuts $g$, to hold them securely in place when adjusted. The inner portion of the frame A is provided opposite to the hangers $f$ with guide-slots $h$, Fig. 5, through which project the axles $d$ which are thus prevented from swinging beyond the desired limit in either direction. Each axle $d$ is turned upward at its inner end and has pivoted to it at 10 a connecting-rod $i$, the opposite end of which is pivoted to the lower end of a lever H, fulcrumed at $k$ to the back-bar C the two levers H H being connected at their lower ends at 12 by a parallel rod $m$ and extending upward on either side of the seat D, where they are each provided with a soft pad $n$ to enable the driver to operate the lever by bringing his body into contact therewith as he leans over to one side in going around a curve. Each lever H, in connection with the rod $i$, pivoted thereto and to the axle $d$, forms a toggle, and these toggles being connected together by the parallel rod $m$ it will be seen that the movement of one lever will be communicated to the other and to both of the rods $i$ in such manner as to cause the inner ends of the two axles to be swung one upward and the other downward, as shown in Fig. 2, thereby inclining both wheels G in parallelism at an angle to their normal vertical plane of revolution. This inclination of the wheels over toward the inner side or center brings them into a position to brace the vehicle against its natural tendency to slew or be thrown by centrifugal force toward the outside of the circle in going around a curve, and consequently the vehicle is kept in its proper course and loss of time is avoided, which is a very important consideration, while the liability of accidents is also materially diminished. After the vehicle has passed the curve it is merely necessary for the driver to throw his body against the opposite lever H, when the wheels will be returned to their normal vertical plane, as shown in Fig. 1.

I do not wish to confine myself to the exact construction of the mechanism for connecting the ends of the levers H with the axles $d$, as it is obvious that it may be varied without departing from the spirit of my invention.

In Fig. 6 is represented a modification in which the levers H are connected by a parallel rod $m$, and each of said levers is connected by a short rod $p$ with a link $q$, pivoted at 15 to the frame A, said link having pivoted to its upper outer end a rod $r$, which is pivoted at its lower end at 16 to the inner end of the axle $d$, and thus as either lever H is thrown outward by the driver the wheels will be inclined to a vertical plane in the same direction as the lever, bringing them into a bracing position, as previously described. This construction I regard as the full mechanical equivalent of that first described, as it effects the same purpose in substantially the same manner.

What I claim as my invention, and desire to secure by Letters Patent, is—

1. In a sulky, the combination with the frame or body, of a pair of wheels mounted on short independent transversely pivoted axles, in combination with connected levers arranged on opposite sides of the seat, and adapted to be operated by the contact of the body of the driver therewith as he leans over to one side, and suitable connections between said levers and axles, whereby as either lever is operated the axles will be swung on their pivots to incline the wheels in parallelism at an angle to a vertical plane, substantially as set forth.

2. In a sulky, the combination with the frame, of a pair of wheels mounted on short independent axles transversely pivoted within hangers at the lower ends of said frame, levers connected together by a parallel rod and extending upward on opposite sides of the seat and adapted to be operated by the contact of the body of the driver therewith as he leans over to one side, and suitable connections between the levers and the transversely pivoted axles, whereby as either lever is operated both wheels will be inclined in parallelism at an angle to a vertical plane, substantially as set forth.

3. In a sulky, the combination with the frame A, provided with guide-slots at its lower end, of a pair of wheels mounted on short independent axles transversely pivoted within hangers at the lower ends of said frame, said axles passing through said guide-slots, levers connected together by a parallel rod and extending upward on opposite sides of the seat and adapted to be operated by the contact of the body of the driver therewith as he leans over to one side, and suitable connections between the levers and the transversely pivoted axles, whereby as either lever is operated both wheels will be inclined in parallelism at an angle to a vertical plane, substantially as set forth.

4. In a sulky, the combination with the frame A, provided with guide-slots $h$, and the seat D, of the wheels G, mounted upon short independent axles $d$, transversely pivoted within hangers at the lower ends of said frame and passing through said guide-slots $h$, the levers H, fulcrumed to the bar C, and connected together at their lower ends by the parallel rod $m$, said levers being provided at their upper ends with pads, and the connecting rods $i$, pivoted to the levers H, and to the inner ends of the axles $d$, all constructed to operate substantially in the manner and for the purpose described.

Witness my hand this 13th day of June, A. D. 1895.

EBEN N. HIGLEY.

In presence of—
A. E. HUMISTON,
P. E. TESCHEMACHER.